United States Patent
Bodnar et al.

(10) Patent No.: US 6,801,525 B1
(45) Date of Patent: Oct. 5, 2004

(54) INTERNET PROTOCOL PACKET ROUTER (75) Inventors: Bohdan Lew Bodnar, Park Ridge, IL (US); Charles Calvin Byers, Aurora, IL (US); James Patrick Dunn, Sandwich, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 758 days.

(21) Appl. No.: 09/613,672

(22) Filed: Jul. 11, 2000

(51) Int. Cl.[7] .............................................. H04L 12/66
(52) U.S. Cl. ...................................... 370/352; 370/392
(58) Field of Search ................................. 370/352, 353, 370/354, 355, 356, 389, 392, 401, 419, 422, 463

(56) References Cited

U.S. PATENT DOCUMENTS

| | | | | |
|---|---|---|---|---|
| 5,740,175 A | * | 4/1998 | Wakeman et al. | 370/422 |
| 5,938,736 A | * | 8/1999 | Muller et al. | 709/243 |
| 6,069,895 A | * | 5/2000 | Ayandeh | 370/399 |
| 6,157,644 A | * | 12/2000 | Bernstein et al. | 370/392 |
| 6,396,833 B1 | * | 5/2002 | Zhang et al. | 370/392 |

* cited by examiner

Primary Examiner—Chau Nguyen
Assistant Examiner—Christine Ng (57) ABSTRACT

Apparatus and a method for routing packets having destination addresses in their header. The routing modules of the router are of two types: simple routing modules which can only route packets whose destination address is stored in a limited memory of the module for storing corresponding output port addresses, and default modules which are used to find the identity of an output port for routing all other packets received by the simple routing modules of the router. Advantageously, the processing load of the simple routing modules is smoothed because these modules do not have to perform the complex searching functions required to find destination addresses not readily accessible in their memory. Advantageously, the single or small number of default routing modules can have sophisticated memory and processor facilities for searching over a very large number of destination addresses and for concentrating the process of sending queries to other routers for additional information.

26 Claims, 5 Drawing Sheets

INTERNET PROTOCOL PACKET ROUTER

TECHNICAL FIELD

This invention relates to telecommunications packet switches, and more specifically, to packet switches which perform a routing function.

PROBLEM

An Internet protocol packet (Datagram) router accepts input packets from many sources and headed for many destinations. Each packet has a header that includes a destination address. Since many of the destinations are frequently encountered in many packets, a router maintains, for a list of frequently used destination addresses, the identity of the output port of the router which is currently being used for routing packets toward that destination. In prior art packet routers, a content addressable memory is used for storing the output port corresponding to the most frequently encountered destination addresses. When this content addressable memory is accessed with the identity of a destination address, if the content addressable memory finds a match between that address and one of its entries, it will provide directly or indirectly the identity of the port to which the packet should be routed. For somewhat less frequently used addresses, a second level memory is provided which stores these destination addresses and the corresponding port identifications. The second level memory can be searched using techniques such as a hash access to find any particular entry.

If no entry is found in either the content addressable memory or the second level memory, a query is sent to neighboring Internet protocol routers to see if they have stored this destination address, and if so, to get some information as to how a packet to that destination address is to be routed. If this query fails, then the packet is sent to a backbone router which has access to a still larger set of destination addresses. Finally, if all else fails, the packet is simply discarded. The large variation in time required to process different packets results in a variation of delay in passing through a router. Further, the total throughput of a router is significantly decreased by the occasional hard-to-route packet.

The design of Internet protocol packet routers therefore presents two types of challenges. First, a simple technological challenge is to process the large number of packets that arrive every second in each module of a router. Second, there is a vast difference in the amount of processing required for packets whose identity is stored in the content addressable memory and which, therefore, can be processed very rapidly, and the packets which require much more extensive data processing. Once the technological problem of handling an adequate number of packets whose destination addresses are known has been solved, the remaining problem is how to process the remaining packets. A problem of the prior art is that there is no sound economic solution to the problem of processing such packets in an Internet protocol router or in any other router which processes data packets having a large number of different destination addresses.

SOLUTION

The above problem is alleviated in a major way in accordance with Applicants' invention, wherein a packet router such as an Internet protocol packet router has two kinds of routing modules: a simple routing module capable of routing packets whose addresses are stored in rapidly accessible memory, and which can, therefore, route such packets based on the result of this rapid memory search, and a default router module, which receives all other packets from the first type of routing modules and processes these packets. Advantageously, the default router module can have a very large memory, a sophisticated processing complex for processing such packets and for handling overall router functions, such as controlling the updating of the routing tables of the simpler routing modules, and can have a large buffer for storing the packets that it is processing during the time that queries to other routers are being made.

Advantageously, the simple routing modules can be designed to handle a very large number of packets without being concerned that a flurry of packets for which they have no routing information will swamp their ability to handle the bulk of their packets; packets for which they have no routing information are simply sent to the default router module for processing by that module. Advantageously, the overflow load from all of the simple routing modules is directed to the default routing module so that if one of the simple modules has an unusually large number of packets which it cannot process, (i.e., packets for which a destination port has not been stored in the router module), the default router can take advantage of the fact that not all of the simple modules are sending a heavy load simultaneously.

Since there is only one, or at most, a small number of default modules, the expense of the default module can be much higher and a more sophisticated processing complex can be provided for that default module without making the entire router excessively expensive.

In accordance with the preferred embodiment, the default module(s) control the updating of the forwarding tables of the simple modules.

DETAILED DESCRIPTION

Figure 1:
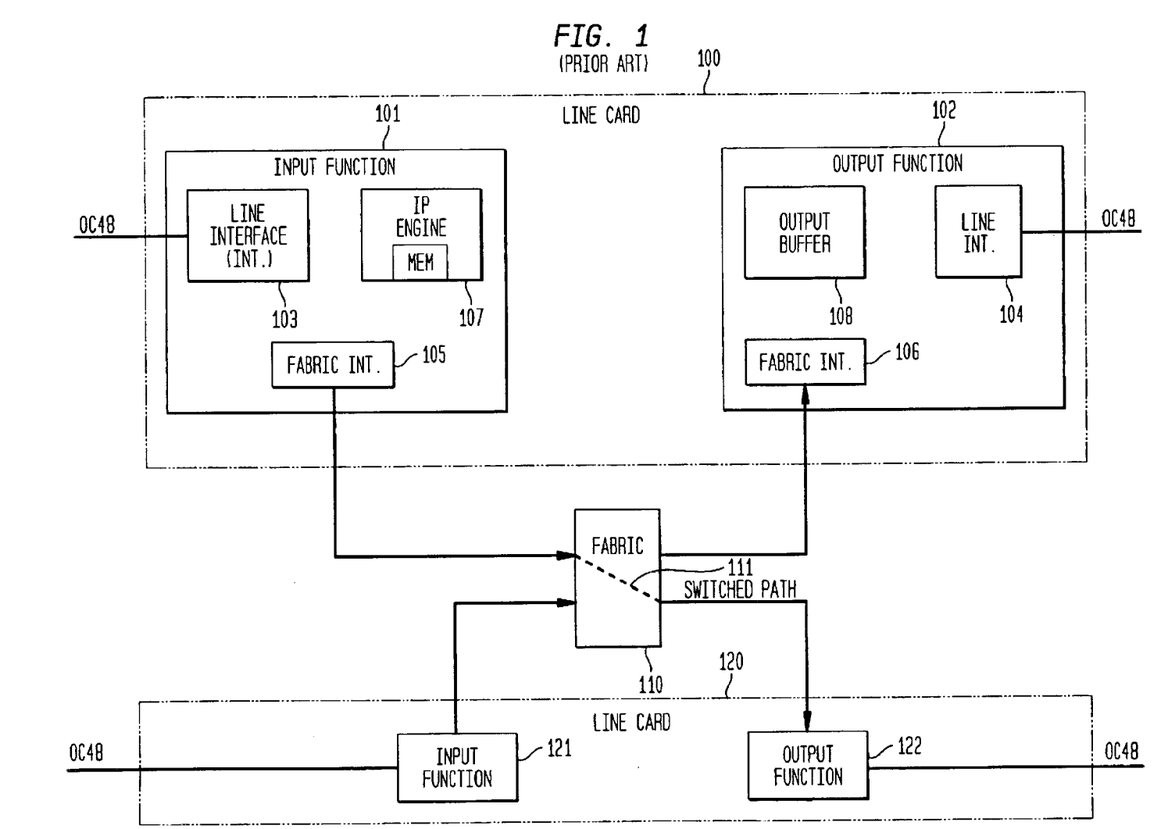
FIG. 1 is a block diagram of a routing node in accordance with the prior art.

FIG. 1 shows a prior art backbone router with line cards 100 and 120 connected to a fabric 110. The line card 100 consists of an input function 101 that consists of a receive line interface 103, a fabric interface 105 and hardware circuitry that implements the IP routing engine 107. The line card 100 also has an output function (102) that has a fabric interface function 106, and output buffer 108, and a line interface 104. The other line card shown also has an input function 121, and an output function 122. In addition, the router would have an OAM&P, (Operations, Administration, Maintenance and Provisioning) process, (not shown), but there is no centralized routing processor. Because the IP routing engine is implemented in hardware, it does not contain a large library of support routines found in a typical software based router. The IP routing engine uses data stored in the line card memory and maintained by the OAM&P processor. The fabric 110 connects any input function to any output function and the fabric is configured, in one preferred embodiment, every 200 nsec. In FIG. 1, the input function 101 is connected by path 111 to output function 122. When the fabric is configured, the packet currently being processed in the IP engine 107 is transferred to the output buffer 128.

Figure 2:
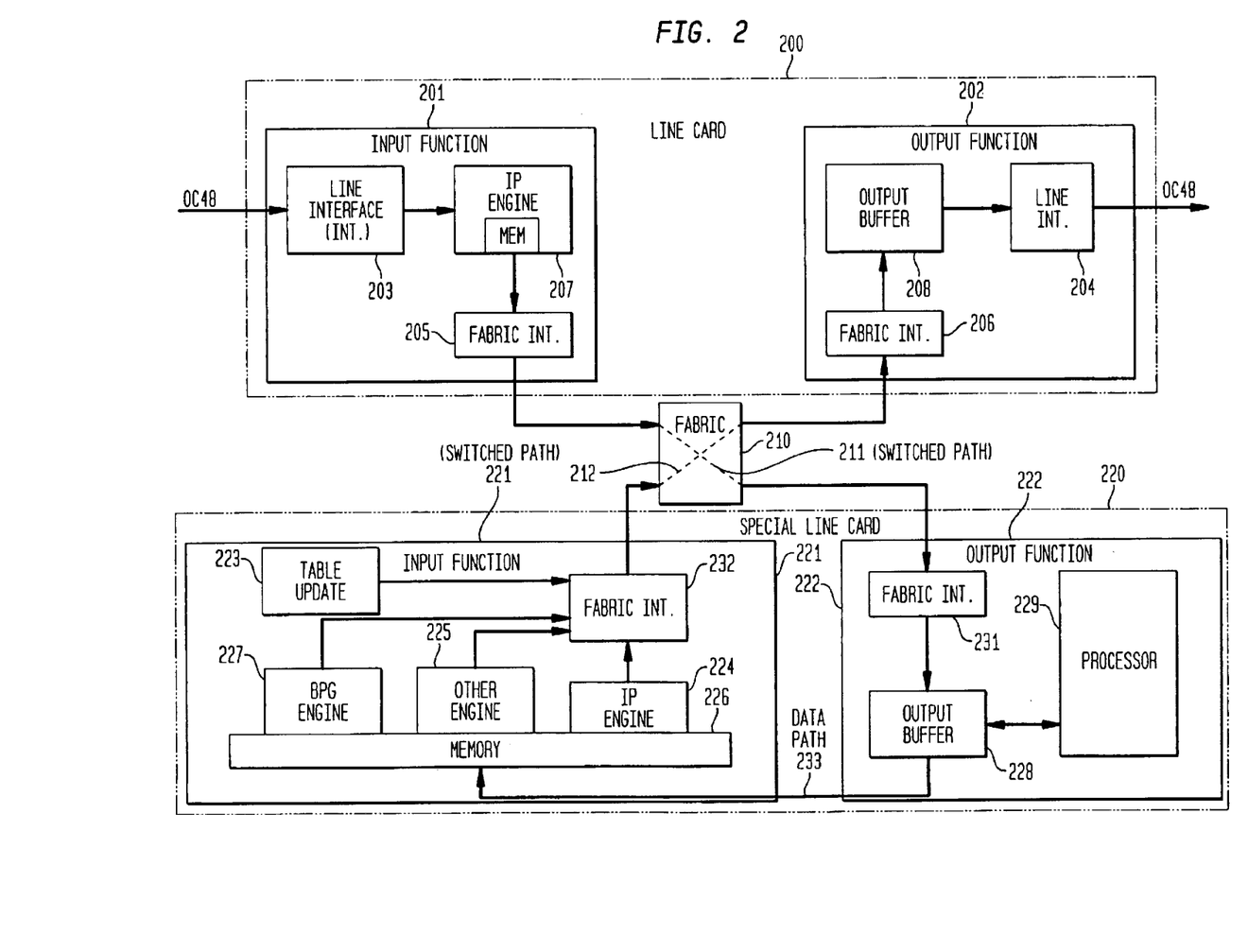
FIG. 2 is a block diagram of a routing node in accordance with Applicants' invention.

In FIG. 2, one of the line cards has been replaced with a special line card 220 that provides a number of special routing functions, including the default route function. Line card 220 does not have any external line interfaces, and obtains and disposes of its traffic via the fabric 210. Fabric 210 switches the output of fabric interfaces 205 and 232 of simple routing module 200 and default routing module 220, to fabric interfaces 206 and 231 of simple routing module 200, (or another such simple routing module, not shown), and of default routing module 220. The special line card 220 has a large packet buffer (228) and a general purpose processor (229) that is used to execute many of the support protocols not provided in FIG. 1. In addition, the general purpose processor has control of the look-up lists stored in the memory 226. This memory can be accessed by the IP engine in the same manner used in line card 200. In addition, there is an engine (227) to handle the BGP, (Border Gateway Protocol), which is commonly used to share routing tables between routers and networks. The special line card also has a table update function (223) that sends periodic updates to the routing table in the other line cards, as required by the protocol.

In this preferred embodiment, each simple module maintains information on the usage, and time of usage, of entries in its routing table. Update information then replaces present entries, or, in the case of new entries, replaces the oldest/least used of present entries in the simple module.

When an indeterminate packet arrives at line card 200, this packet cannot be routed by the IP engine 207, and it is therefore routed over path 211 in fabric 210 to the default router 220, and therein, to the fabric interface 231 of the special line card 220 output function 222, where it is placed in the output buffer 228. The processor 229 examines the packet. If the packet is a routing table update packet, it updates the memory 226. If the packet is an IP data packet, it determines the final route, updates the memory 226, sends the packet over data path 233 to input function 221, and schedules the packet for routing by the IP engine 224 via fabric interface 232 and, over switched path 211 network fabric 210. Also, update information is sent to line card 200 so as to update memory of the routing engine 207. If the processor can not determine the route, it will prepare a query to other routers for information about the address and schedule this to be routed by the BGP engine. If the query is successful, the processor 229 will update the memory 226 and schedule the packet to be processed by the IP engine 224. If the Processor 229 still can not route the packet, it is dropped.

Periodically, (every 10 to 20 seconds), the Processor 229 instructs the table update function (223) to send the changes to the memory 226 to the other line cards. When line card 200 receives the update for the address that it previously could not route, it begins to route future packets with that address without the aid of the special line card 220.

Alternatively, the table updated in line card 200 can be launched in real time to limit the load on line card 220. The decision to use a periodic table update or a real time update, can be based upon monitors of the occupancy of the processor 229, or the usage of the buffer 228 on line card 220. In addition, the decision to real time update can be selective, with the decision based on the number of line cards sending traffic for a particular address, or on the amount of traffic to a particular address. This selective update can be augmented with a selective clear that would allow traffic to a specific address to be routed to the special line card 220 for special study or data wiretap purposes. Wiretap or other monitoring can be implemented by requesting the simple routers to route to wiretap equipment; by requesting the simple routers to route to the default router for multi-casting to wiretap equipment and the destination; and to route to the default router for checking and analysis in one of the "other engines" 225.

Figure 3:
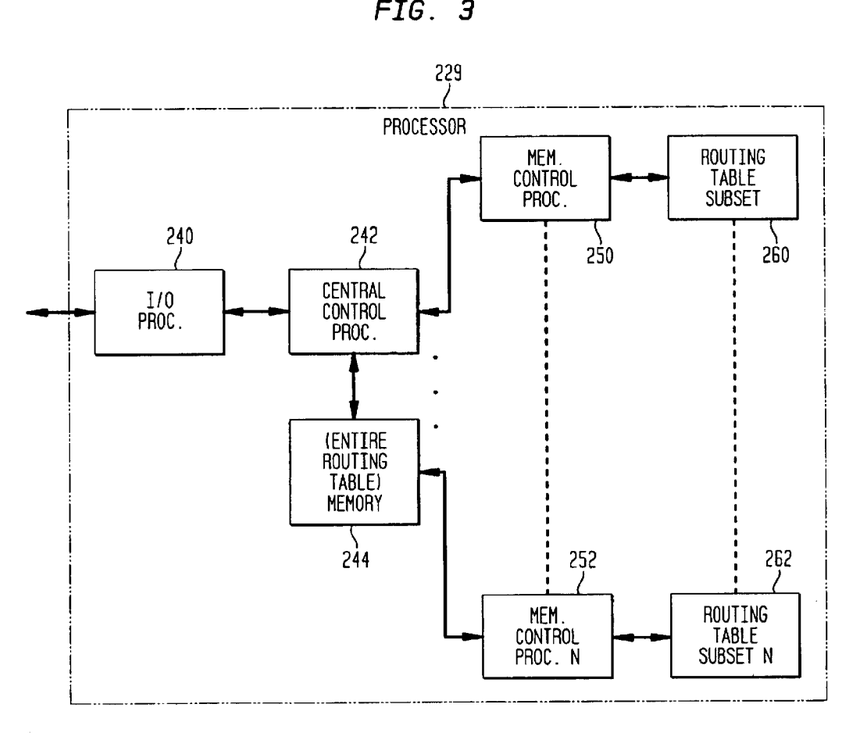
FIG. 3 is a block diagram of a processor for a default routing module.

FIG. 3 is a detailed diagram of one embodiment of processor 229. The default routing module of Applicants' invention performs all the searches for packets whose destination addresses are not found in a routing table of one of the simple routers, therefore, it is constantly making searches over a large table whose contents cannot be stored in a content addressable memory or a cache type memory. Since it is a specialist router, it can be made to store a very large routing table, and can be more expensive in its use of resources than the simple routers. The processor 229 receives inputs from output buffer 228, (which has received a packet from one of the simple routing modules via the fabric interface 231. The output buffer is fed into an IO processor 240, which communicates with a central control processor 242. The central control processor has access to two versions of the routing table. A first version containing the entire routing table in memory 244, is used for the purpose of updating the routing table that is used in the search process. In order to make the search process as efficient as possible, a group of N memory control processors 250, . . . , 252, each communicate with a sub-set 260, . . . , 262, of the routing table. The search is thus made in parallel by each pair of memory control processors such as 250, and corresponding routing table sub-sets such as 260. The results of the search are communicated to the central control processor 242, which communicates with the output buffer 228 via the IO processor 240. The result of the search is then used either to forward the packet to the output portion of a simple routing module, such as 202, for transmission to the next packet node on the path to the destination, or is sent to a default node for further searching, or is discarded. In addition, the central control processor 242 arranges to send a control packet to the simple routing module that had requested that the packet be routed by the default routing module in order to update the routing table of that simple routing module.

Periodically, or on a continuous basis between searches, the contents of the entire routing table 244 are transmitted to the various routing table sub-set memories 260, . . . , 262.

The memory control processors 250, . . . , 252, can perform searches for different destinations at any particular time. Thus, if one of the routing table sub-sets is particularly heavily used, its control processor can process a smaller number of address searches during a particular period of time. Consequently, during the update of the routing table sub-sets, the central control processor 242 can arrange that an overloaded routing table sub-set be populated with less frequently searched routing table addresses. When a packet address destination is found in one of the routing table sub-set entries, the simple router which transmitted the packet has its address routing table updated. This is done by sending a control packet from the default router to the simple router. The packet is sent via one of the paths, (not shown), between an output portion 202 of a simple router, and the input portion 201 of the simple router that had sent the packet to the complex router.

Many different search and storage algorithms are well known in the art. The choice among these algorithms will require simulation or testing.

For the case of packets whose destination address does not have a corresponding port identity in the routing table of the complex router, the complex router may request routing information from other routing nodes of the packet network. This request is generated as a packet sent from the default router 220 to one or more other routing nodes. Responses from these other routing nodes are routed to the default router of this node.

Figure 4:
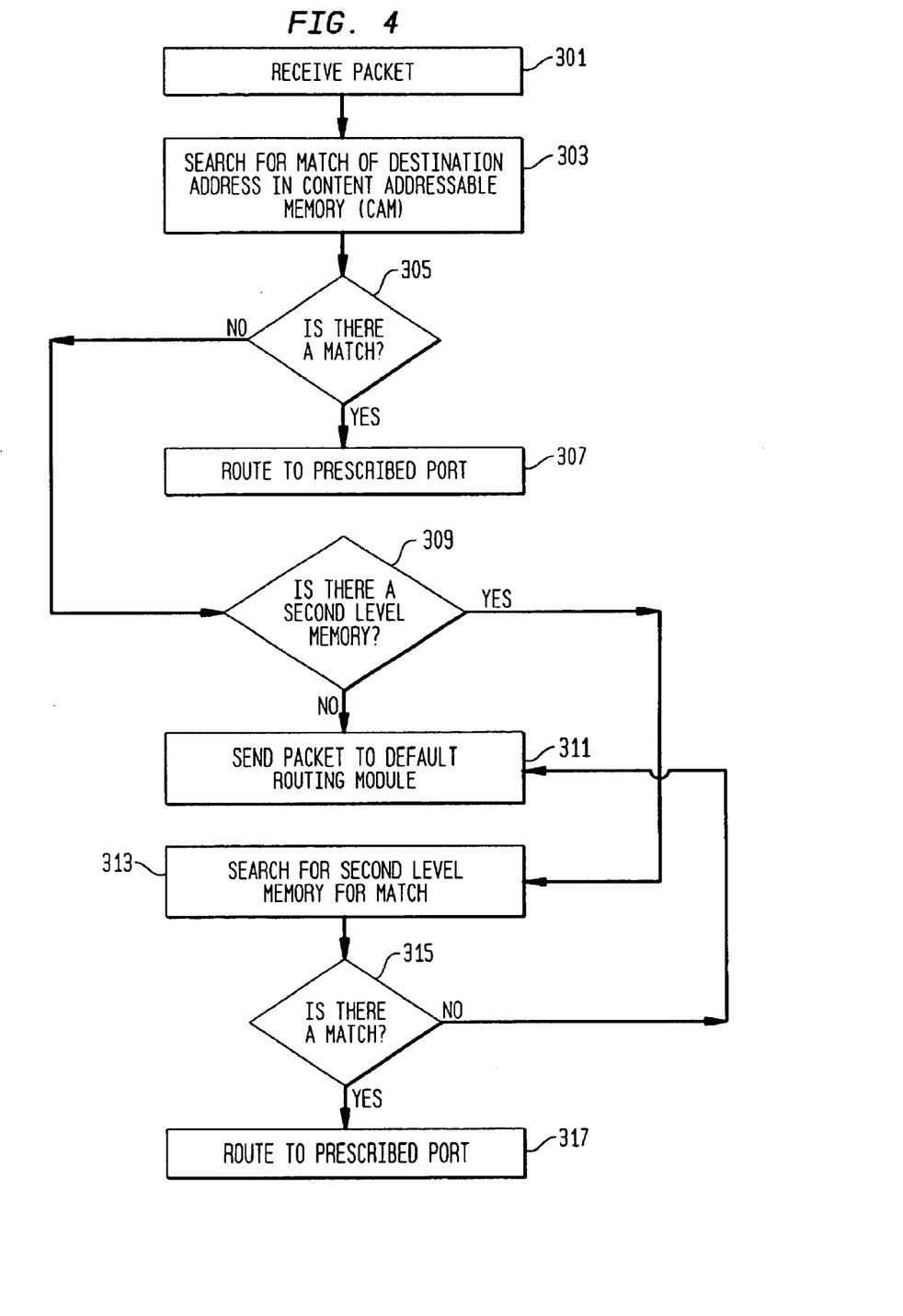
FIG. 4 is a flow diagram of actions performed by the simple routing modules.

FIG. 4 illustrates the actions performed in a simple routing module in accordance with this invention. The routing module receives a packet, (Action Block 301). The module searches for a match of the destination address of the packet in its content addressable memory, (Action Block 303). For example, this could be a search of the IPV6 (Internet Protocol Version 6). "Flow Field". Test 305 tests whether a match was found. If so, then the packet is routed to the port prescribed in the information associated with the match of the content addressable memory, (Action Block 307). Test 309 represents a test of whether or not the simple modules also contain a second level memory, such as a cache, or random access memory. The engineering decision of whether these modules should also search a second level memory is a complex one, and likely to be determined only after extensive simulation or testing, possibly augmented by field experience. It may well turn out that the net performance of the overall router is adversely affected by having a second level memory in each of the simple modules. If so, no second level memory will be provided, and the result of Test 309 is negative; the packet is then sent to the default routing module for further processing in accordance with the flow diagram of FIG. 4. If a second level memory is provided in the simple routing modules, then a search is made of the second level memory to see if there is a match with the destination address, (Action Block 313). The search may be made using well known techniques, (e.g., hash accessing or binary trees), and, of course, need not be made by examining every entry in the back-up memory. Test 315 checks whether a match was found. If not, then the packet is sent to the default routing module, (Action Block 311), previously described. If a match was found, then the packet is routed to the prescribed port, (Action Block 317).

Figure 5:
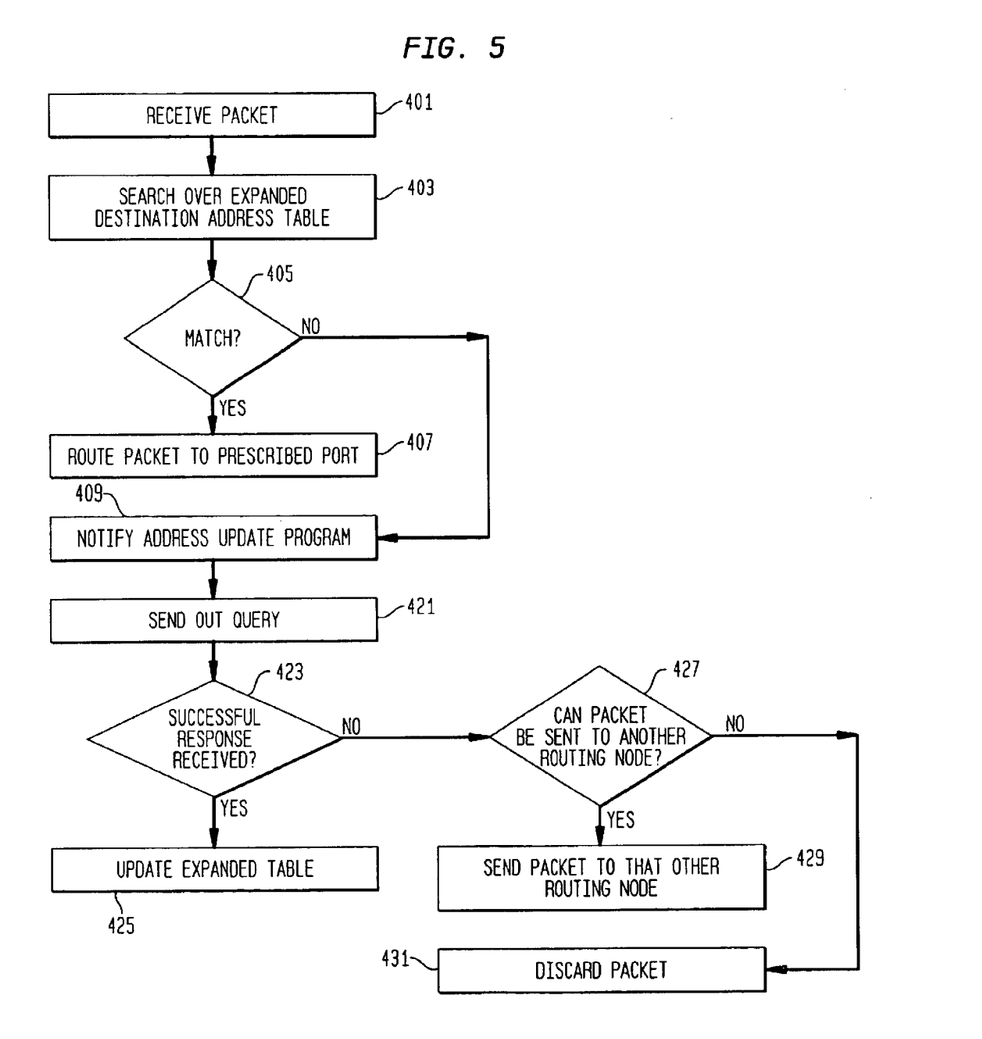
FIG. 5 is a flow diagram illustrating operations performed by the default routing module.

FIG. 5 illustrates the actions performed in the default routing module in response to receipt of a packet from one of the simple routing modules. The default routing module receives the packet, (Action Block 401). The module searches over its own expanded destination address table, (Action Block 403). Test 405 is used to determine whether a match was found in the search. If a match was found, then the packet is routed to the prescribed port, (Action Block 407), and the address update program is notified of this match, (Action Block 409). If enough matches with a particular address are found in a relatively short time, then the routing tables of one or more of the simple modules can be updated.

If no match was found, then a query is sent to neighboring routing modules, (Action Block 421). Test 423 determines whether a successful response to the query was received. If so, then the expanded table is updated, (Action Block 425), and Action Block 407 previously described, to route the packet and subsequently, notify the address update program is performed.

If no response is received for the query, then Test 427 determines whether a packet can be sent to another router. This is possible if there is another router at the same or higher level in the hierarchy of the routers, and if that router has not previously sent a message indicating that no further packets are to be sent to that router. If the packet can be sent, (positive result of Test 427), the packet is routed to that other node (Action Block 429). Finally, if the result of Test 427 is negative, then the packet is simply discarded, (Action Block 431).

In summary, the simple routing modules (200) route most packets very quickly and route any packets that they cannot readily route to a complex routing module (220). The complex routing module 220 has a large address table and implements the BGP function for obtaining address information from other routing systems. The complex routing module will either find an address and transmit the packet to a simple routing module for transmission to the network, or it will send the packet to a default routing node of the packet network, or will discard the packet. In Applicants' preferred embodiment, the complex routing module maintains traffic counts for addresses of packets routed to that module, for updating the routing tables of the simple modules. The simple modules maintain counts of packet address usage so that addresses which are rarely encountered can be deleted in favor of new addresses provided by the complex routing module.

The above description is of one preferred embodiment of Applicants' invention. Many other embodiments will be apparent to those of ordinary skill in the art without departing from the scope of the invention. Accordingly, Applicants' invention is limited only by the attached Claims.

What is claimed is:

1. Apparatus for routing packets, comprising:
   at least one simple routing module, each simple routing module comprising an input function and an output function, having limited routing capabilities;
   at least one default routing module for routing packets that can not be routed by an input function of a simple routing module;
   a network fabric for interconnecting input functions of said at least one simple routing module and said at least one default routing module, and for establishing connections between input functions and output functions of simple modules, and for establishing connections between said at least one default routine function and output functions of said simple modules;
   each of said simple routing modules connected to facilities for receiving and transmitting data packets;
   each of said simple modules for transmitting those received packets which can be routed by a receiving simple module over said network fabric to an output function of a simple module connected to facilities for reaching a next hop destination determined by said receiving simple module; and
   each of said simple modules for transmitting those received packets which cannot be routed by a receiving simple module over said network fabric to one of said at least one default routing module for routing to an output function of a simple module connected to facilities for reaching a next hop destination determined by said at least one default routing module.

2. The apparatus of claim 1, wherein at least one of said simple modules can route packets only if their destination address is stored in a content addressable memory.

3. The apparatus of claim 1, wherein at least one of said simple routing modules can only route packets whose destination address is stored in a random access memory (RAM) of a simple routing module receiving said packet.

4. The apparatus of claim 1, wherein at least one of said simple routing modules can route packets whose destination address is stored in one of a content addressable memory, a cache, and a random access memory (RAM) of a simple module receiving said packet.

5. The apparatus of claim 1, wherein said default routing module queries other routing nodes to attempt to find information for routing a packet.

6. The apparatus of claim 1, wherein each of said routing modules is a router of Internet Protocol (IP) packets.

7. The apparatus of claim 1, wherein said at least one default routing module controls an updating of routing information in said simple modules.

8. The apparatus of claim 7, wherein said updating is scheduled based upon a load of said at least one default routing module.

9. The apparatus of claim 1, wherein said at least one simple routing module is connected to transmission facilities for carrying packets between nodes of a packet network; and wherein said at least one complex routing module is switchably connected to said at least one simple routing module but is not connected to said transmission facilities.

10. The apparatus of claim 1, wherein said default routing module comprises apparatus for wiretapping or monitoring selected sources and/or destinations, and wherein packets received from a simple routing module from a selected source and/or to a selected destination are routed to said apparatus for wiretapping.

11. The apparatus of claim 1, wherein said default routing module recognizes selected source and/or destination addresses and routes packets from a selected source and/or to a destination address of a packet being monitored or wiretapped.

12. In a routing node of a packet network, a method of routing packets, comprising the steps of:

providing at least one simple routing module having limited routing capabilities;

transmitting packets routed by said at least one simple routing module directly to a simple routing module connected to transmission facilities connected to a route determined by said at least one simple routing module;

providing at least one default routing module for routing packets that can not be routed by a simple routing module;

transmitting packets that can not be routed by a simple routing module over a network fabric to said at least one default routing module;

determining route for packets received from a simple routing module by said at least one default routing module; and transmitting packets from said at least one default routing module over said network fabric to simple routing modules connected to facilities for transmitting data packets to the route determined by said at least one default routing module.

13. The method of claim 12, further comprising the step of:

at least one of said simple modules routing packets toward a destination, only if their destination address is stored in a content addressable memory of said at least one of said simple modules.

14. The method of claim 12, further comprising the step of:

at least one of said simple routing modules only routing packets whose destination address is stored in a random access memory (RAM) of a simple routing module receiving said packet.

15. The method of claim 12, further comprising the step of:

at least one of said simple routing modules routing packets whose destination is stored in one of a content addressable memory, a cache, and a random access memory (RAM) of a simple module receiving said packet.

16. The method of claim 12, further comprising the step of:

said default routing module querying other routing nodes to attempt to find information for routing a packet.

17. The method of claim 12, further comprising the step of:

each of said routing modules routing Internet Protocol (IP) packets.

18. The method of claim 12, further comprising the step of:

said at least one default routing module controlling an updating of routing information in said simple modules.

19. The method of claim 18, wherein the step of updating is scheduled based upon a load of said at least one default routing module.

20. The method of claim 12, further comprising the steps of:

said at least one simple routing module being connected to transmission facilities for carrying packets between nodes of a packet network; and said at least one default routing module being switchably connected to said at least one simple routing module but not being connected to said transmission facilities.

21. The method of claim 12, further comprising the steps of:

in said default routing module, recognizing that a packet is to be monitored or wiretapped;

in response to said recognizing, routing said packet to apparatus for monitoring or wiretapping said packet.

22. The method of claim 21, further comprising the step of:

routing said packet to a destination address of said packet.

23. Apparatus for routing packets, comprising:

at least one simple routing module, having limited routing capabilities;

at least one default routing module for routing packets that can not be routed by a simple routing module;

a network fabric for interconnecting said at least one simple routing module and said at least one default routing module, and for establishing connections between simple modules;

each of said simple routing modules connected to facilities for receiving and transmitting data packets;

wherein said default routing module comprises apparatus for wiretapping or monitoring selected sources and/or destinations, and wherein packets received from a simple routing module from a selected source and/or to a selected destination are routed to said apparatus for wiretapping.

24. Apparatus for routing packets, comprising:

at least one simple routing module, having limited routing capabilities;

at least one default routing module for routing packets that can not be routed by a simple routing module;

a network fabric for interconnecting said at least one simple routing module and said at least one default routing module, and for establishing connections between simple modules;

each of said simple routing modules connected to facilities for receiving and transmitting data packets;

wherein said default routing module recognizes selected source and/or destination addresses and routes packets from a selected source and/or to a destination address of a packet being monitored or wiretapped.

25. In a routing node of a packet network, a method of routing packets, comprising the steps of:

providing at least one simple routing module having limited routing capabilities;

providing at least one default routing module for routing packets that can not be routed by a simple routing module;

transmitting packets that can not be routed by a simple routing module over a network fabric to said at least one default routing module;

transmitting packets from said at least one default routing module over said network fabric to simple routing modules connected to facilities for transmitting data packets to the route determined by said at least one default routing module;

in said default routing module, recognizing that a packet is to be monitored or wiretapped;

in response to said recognizing, routing said packet to apparatus for monitoring or wiretapping said packet.

26. The method of claim 25, further comprising the step of:

routing said packet to a destination address of said packet.

\* \* \* \* \*